United States Patent
Dickmeiss et al.

[11] Patent Number: 5,887,972
[45] Date of Patent: Mar. 30, 1999

[54] EXTRUDER FOR PLASTIC GRANULES

[75] Inventors: Friedel Dickmeiss, Eschweiler; Klaus Schafer; Wolfgang Imping, both of Remscheid, all of Germany

[73] Assignee: Barmag AG, Remscheid, Germany

[21] Appl. No.: 853,550

[22] Filed: May 9, 1997

[30] Foreign Application Priority Data

May 10, 1996 [DE] Germany ............... 196 18 921.7

[51] Int. Cl.⁶ .................... B29B 7/24; B29B 7/42
[52] U.S. Cl. ................. 366/76.1; 366/79; 366/102; 366/144; 34/179
[58] Field of Search ............ 366/75, 76.1, 101, 366/102, 106, 107, 144, 145, 147, 139, 150.1, 154.1, 156.1, 157.1, 157.2, 158.2, 158.3, 158.4, 323; 425/208; 264/328.14; 34/179

[56] References Cited

U.S. PATENT DOCUMENTS

| | | |
|---|---|---|
| 2,783,498 | 3/1957 | Richardson . |
| 3,217,783 | 11/1965 | Rodenacker . |
| 3,493,031 | 2/1970 | Williams, Jr. . |
| 3,500,901 | 3/1970 | Root, 3rd et al. . |
| 3,563,514 | 2/1971 | Shattuck ............... 366/75 |
| 3,572,647 | 3/1971 | Stabeli ................. 366/75 |
| 3,781,132 | 12/1973 | Latinen ................ 366/75 |
| 3,797,550 | 3/1974 | Latinen ................ 366/323 |
| 4,636,085 | 1/1987 | Lopernicky ............ 366/145 |
| 5,662,415 | 9/1997 | Gisko .................. 366/139 |

FOREIGN PATENT DOCUMENTS

| | | |
|---|---|---|
| 0 134 977 | 3/1985 | European Pat. Off. . |
| 2 297 124 | 8/1976 | France . |
| 44 28 867 | 2/1996 | Germany . |
| 44 29 390 | 2/1996 | Germany . |

*Primary Examiner*—Tony G. Soohoo
*Attorney, Agent, or Firm*—Alston & Bird LLP

[57] ABSTRACT

An extruder for melting plastic granules which is designed as a two-stage system in an integrated structural unit with an extruder chamber having an extruder screw in a heatable housing, as well as with a drying chamber having a heated conveying screw with displacement elements which dry the plastic granules and axially convey them to the extruder chamber without compression. In a preferred embodiment, the conveying screw has a larger diameter than the extruder screw, and displacement elements of greater depth than the extruder screw.

22 Claims, 3 Drawing Sheets

EXTRUDER FOR PLASTIC GRANULES

BACKGROUND OF THE INVENTION

The present invention relates to an extruder for melting and extruding plastic granules of the type commonly used in the spinning of polymeric filaments.

In the extrusion of plastic granules, especially for a polymer that is suitable for use in a melt spinning process, the following process steps are usually involved; drying, feeding, melting, degassing and discharge of product. In the conventional systems the first process step, namely drying, is carried out by means of a drier and is generally performed independently of the actual extrusion, in a process that takes place continuously or also batchwise in a separate drying device. The spun-dry granules are then fed to an extruder in which the further process steps up to discharge of the product take place, the degassing being directly dependent on the degree of drying of the granules.

EP 0 134 977 B1 describes a device for removing volatile constituents from plastic materials, which for molding is conveyed through a plasticising screw and plasticised therein. This plasticising screw is arranged in a heated cylinder through which the particulate plastic material is fed. The plasticising screw comprises an actual plasticisation section and a conveying section arranged upstream of the latter. An additional conveying screw arranged upstream of this plasticising screw conveys the material to be extruded to a suction channel, from which it falls into the conveying section of the plasticising screw. Since the cylinder in which the plasticising screw operates is heated, and since through the work of the plasticising screw energy is supplied to the material to be extruded, volatile constituents escape, so that the granules are dried to a certain extent. These volatile constituents are removed, through the suction line, from the cylinder in which the plasticising screw operates. In order to ensure that these volatile constituents are removed, the conveying screw and the plasticising screw are driven so that only such an amount of granules is fed to the plasticising screw as to ensure that the latter is only partially filled in the region of the suction line, in other words in its conveying section.

As regards the efficiency of the drying of the granules, this known arrangement has inter alia the disadvantage that the granules are only indirectly heated. On the one hand energy losses thus occur, and on the other hand an additional device is furthermore necessary to ensure a reduced pressure for suctioning off the volatile constituents, which in turn requires additional energy. The known arrangement can therefore be used only to a limited extent for drying granules, and is better suited primarily for removing volatile constituents from the plastic material to be extruded.

It is accordingly an object of the present invention to provide an extruder that is of compact construction, which in addition to feeding, melting, degassing, and removing the resulting melt, can also effectively dry the plastic granules, and which furthermore is energy-saving and economical to operate.

SUMMARY OF THE INVENTION

The above and other objects and advantages of the present invention are achieved by the provision of an extruder for the plastic granules, which in particular may be a polymer suitable for spinning, and which comprises an extruder chamber which includes an extruder screw having a plasticising section and a conveying section. The extruder screw is rotatably mounted in a heatable extruder housing and is rotated by a drive unit. Furthermore, the extruder is constructed as a two-stage system in an integrated structural unit, which includes a drying chamber comprising a conveying screw rotatably arranged in a drying housing installed upstream of the extruder chamber. The conveying screw is rotatably connected to the extruder screw, and it conveys the plastic granules without compression to the extruder housing.

Preferably, the conveying screw has a larger external diameter than the extruder screw, and both the conveying screw and the extruder screw are provided with displacement elements for axially conveying the plastic granules upon rotation thereof. Also, the conveying screw preferably has displacement elements of greater depth than those of the extruder screw. Furthermore, the conveying screw is designed so that it can be heated for drying the plastic granules. This construction of the conveying screw means that the latter comprises a large heat-emitting surface that immediately dissipates the heat to the adjacent plastic granules. The geometrical design also permits a long residence time of the granules within the drying chamber, resulting in a uniform and very high degree of drying of the plastic granules. The displacement elements of the two screws are formed for example by a spiral screw surrounding the cylindrical shaft of the screw.

In order to enhance the drying of the plastic granules, it is advantageous to provide an air gap between the conveying screw and the interior wall of the drying housing so that the residence time of the granules is substantially raised and the conveying action is reduced.

In a particularly advantageous embodiment of the invention, the conveying screw is designed so as to have a plurality of displacement elements arranged on its circumference. These displacement elements may be formed as vanes, paddles, etc. Such displacement elements result in a very good mixing of the plastic granules. In this way the uniformity of the drying within the granules is improved still further.

The drying effect in the drying chamber can be enhanced according to the invention by applying a drying medium to the plastic granules. Owing to the fact that the displacement elements are arranged on the conveying screw in such a way that the plastic granules are intensively mixed with only a slight conveying action, and that an active drying process is effected in the region of the drying chamber by adding a drying medium, it is possible to produce dry granules that basically do not require any degassing in their further processing in the extruder.

So that the drying process can be effectively realized, only such an amount of granules is added to the drying chamber through an inlet funnel that the space between the displacement elements of the conveying screw and the drying housing can ensure a reliable and intensive flow around the granule particles to be dried. Preferably the drying medium is blown at a suitable excess pressure into the drying chamber so that, after the drying procedure has been carried out, it is removed through a discharge line. In order to be able to utilize further the energy still contained in the drying medium, the latter can be recycled, in which connection it has to be reheated to such an extent before being blown into the drying chamber again that the temperature loss of the drying medium as a result of the release of heat to the granule particles is compensated.

According to a preferred embodiment, the conveying screw of the drying chamber has a channel formed in the interior of its shaft, in other words the shaft is hollow, and also has outlet bores arranged between the displacement elements and connected to this channel, through which bores the drying medium can be fed to the actual drying region between the displacement elements of the conveying screw. Preferably these outlet bores are arranged radially over the circumference of the shaft of the conveying screw and between the displacement elements. The bores are preferably arranged uniformly over the circumference. The particular advantage of this embodiment is that the conveying screw is heated by the hot drying medium. Depending on the design of the channels, electrical heating of the conveying screw can be omitted.

According to a further preferred embodiment the drying medium is introduced into the drying chamber in such a way that it is fed in countercurrent to the conveying direction of the plastic granules. Preferably the drying medium is hot air.

According to yet a further preferred embodiment, the extruder screw and the conveying screw are arranged relative to one another so that both screws are rotatably driven by means of a common drive unit. The rotational driving force can be transmitted between the extruder screw and the conveying screw by means of a gear transmission. This is a particularly advantageous arrangement for carrying out arbitrary conversions. A particularly compact construction is achieved if the extruder screw and the conveying screw are arranged on a common shaft.

A further advantage of the extruder of the present invention is that a very compact extruder can be obtained, since both the drying chamber and the extruder chamber can be assembled and installed in an integrated structural unit.

According to a further preferred embodiment, the transition region between the diameter of the conveying screw and the diameter of the extruder screw is substantially continuous, and in the form of a substantially conical member. A continuous and uniform filling of the extruder screw with the plastic granules is achieved by means of such a conical transition between the regions of different diameters.

A particularly energy saving and economical design of the extruder according to the invention is achieved if the drying medium can essentially be heated by means of a heat transfer device in which the energy that is released on compressing the plastic granules in the extruder chamber is utilized by transferring this energy to the drying medium. The drying medium or a part thereof leaving the drying chamber is preferably fed to this heat transfer device, thereby compensating for the energy lost by the drying medium through release of energy to the granules.

According to yet another preferred embodiment, a metering device is arranged between the drying chamber and the extruder chamber. The passage cross-section of the metering device is able to be altered so as to regulate the residence time of the plastic granules in the drying chamber. A metering device that can be altered as regards the passage cross-section enables the drying chamber to be adapted easily to different degrees of moisture in the granules to be dried, without having to change significantly the process as regards the temperature of the drying medium or amount of granules added to the drying chamber. The metering device is preferably formed as a diaphragm whose passage cross-section can be regulated via an adjustable slide valve.

According to yet another preferred embodiment, the housing of the drying chamber also can be heated. This produces a greater degree of flexibility in carrying out the drying process since the granules to be dried benefit from a corresponding input of energy from the region of the conveying screw itself, via the drying medium, as well as from the wall surrounding the conveying screw.

Since during the extrusion process work is performed on the plastic granules during their passage through the extrusion chamber, their internal energy is increased, resulting in the expulsion of volatile constituents. Accordingly, in a further preferred embodiment of the invention at least one outlet channel for the discharge of gases that are formed or released is provided in the wall of the housing surrounding the extruder screw. Depending on their nature, these gases can either be trapped or released to the atmosphere.

The granules in the drying chamber are thus dried by mechanical energy in the form of friction, by heat transfer via contact of the granules to be dried with the surface of the screw, as well as by heat transfer from the drying medium flowing around the granule particles.

Besides regulating the residence time of the material to be dried in the drying chamber of the two-stage extruder by means of the metering device, this device can also be used to achieve a starve-feed operation of the extruder in the actual extrusion stage.

BRIEF DESCRIPTION OF THE DRAWINGS

Further advantages, features and possible applications of the present invention will now be described in more detail with reference to the drawings, in which.

DETAILED DESCRIPTION OF THE PREFERRED EMBODIMENTS

Figure 1:
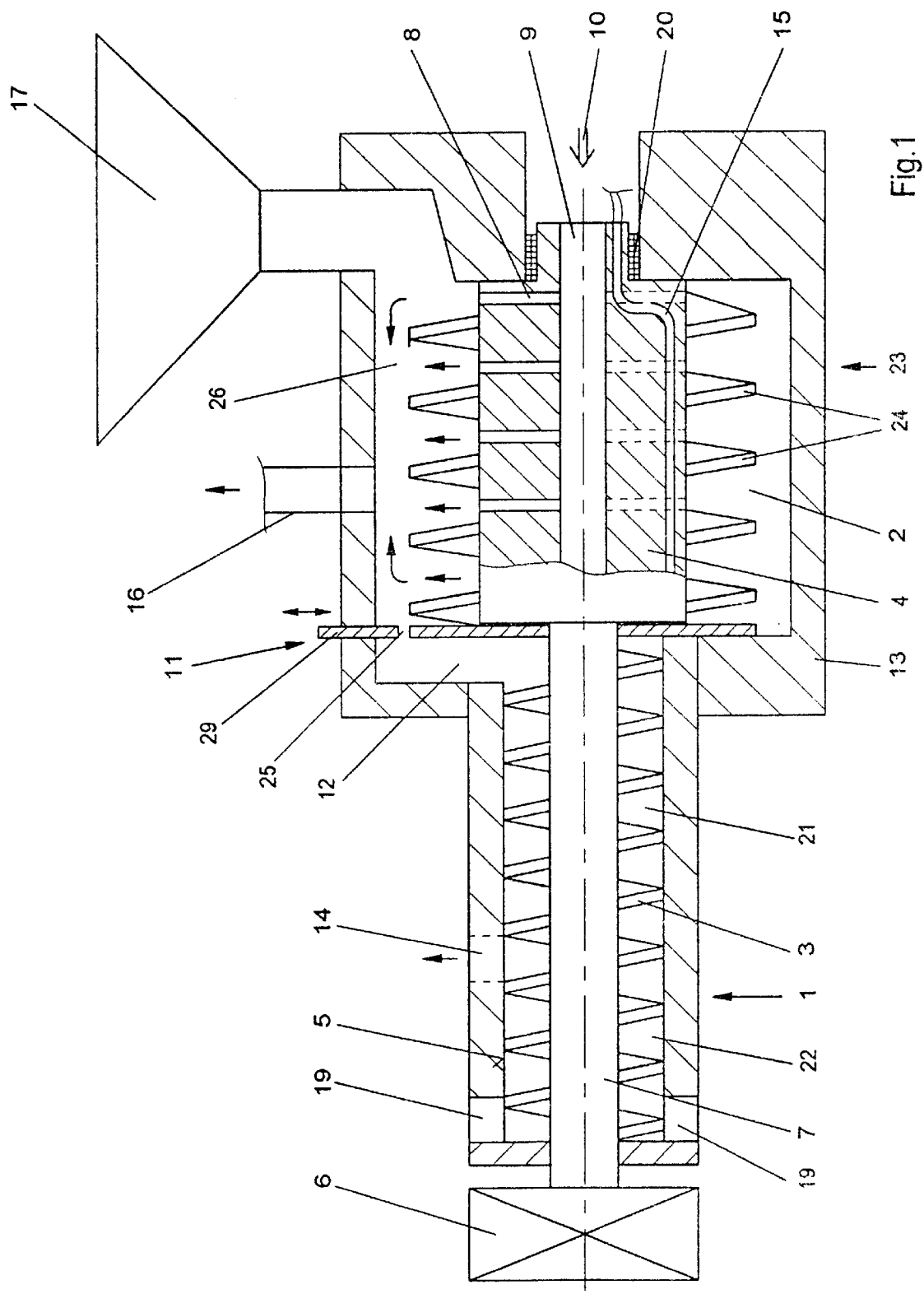
FIG. 1 is a sectional side elevation view of an extruder and which shows a two-stage extruder with a drying chamber and extrusion chamber according to the invention, and in which the common shaft is driven from the extrusion chamber side.

FIG. 1 shows a two-stage extruder according to the invention, having an extruder chamber 1 and a drying chamber 23. In the extruder chamber 1 an extruder screw 3 is rotatably arranged in a tubular extruder housing 5. The extruder screw 3 has on the inlet side with the inlet 12 a conveying section 21, and on the discharge outlet 19, a plasticising section 22. In the drying chamber 23 a conveying screw 4 is rotatably arranged in a housing 13. A drying zone 2 is formed between the conveying screw 4 and the housing 13. The conveying screw 4 has a plurality of displacement elements 24 arranged on its circumference that project into the drying zone 2. The displacement elements 24 may for example be discs, paddles, vanes or a screw forming a helical flight.

The extruder screw 3 as well as the conveying screw 4 are arranged on a common shaft 7. In order that the actual compression process can take place in the extrusion chamber 1, the screw-shaped displacement element of the extruder screw 3 is in the form of a helical screw flight which extends substantially to the internal surface of the extruder housing 5.

In the region of the drying chamber 23, the granules 18 to be dried, which are preferably fed in a controlled manner to the drying zone 2 from a storage hopper 17, are simply circulated and conveyed by the conveying screw 4, but are not compressed. The height of the displacement element 24 of the conveying screw 4 is dimensioned so that the external diameter of the envelope is less than the internal diameter of the cylindrically shaped internal bore of the housing 13, and an annular air gap 26 is thereby formed. An improved heat exchange between a heating medium 10 and the granules 18 to be heated is possible on account of this annular gap, which typically is at least about one third the depth of the displacement element 24. Moreover, the residence time is thereby increased. Hot air 10, which is fed through a channel 9 in the interior of the conveying screw 4, serves as the heating medium. This internal channel 9 is connected via radially formed feed channels 8 running between the displacement elements to the external circumference of the conveying screw 4. The air fed in this way through the channel 9 flows through the channels 8 into the region between the displacement elements, in which the granules 18 are deposited.

The flow rate of the drying medium 10 is chosen so as to achieve a favorable heat exchange between the hot air and the granules. The outlet opening 16 for the drying medium is arranged approximately in the middle of the longitudinal extent of the drying zone 2. Some of the granules 18 to be heated are thereby heated in countercurrent, the remainder of the granules being heated in co-current in the annular space.

It is also possible to feed the drying air together with the granules 18 through the hopper 17 of the drying chamber 23. In the region of the drying zone 2 the conveying screw 4, which is supported in a bearing 20, is provided with a heating device 15. This heating device 15 may be an electrical heating device, though oil heating may also be employed. The device serves to achieve a greater degree of flexibility of the drying chamber 23. In principle it is thus possible to carry out the drying of the granules 18 by feeding a drying medium 10 and/or by providing the conveying screw 4 with a heating device 15 and/or additionally providing the housing 13 of the drying chamber 23 with a heating device.

A metering device 11 in the form of a diaphragm is arranged in the transition region between the drying zone 2 and the cylinder 5. This diaphragm can be adjusted as regards the passage opening 25, as indicated by the double arrow. A slide valve 29 is suitably regulated for this purpose. By regulating the passage opening 25 of the diaphragm 11 it is possible to vary the residence time of the granules 18 in the first processing stage of the extruder, thereby enabling the degree of drying of the granules, which depends on the polymer, to be adjusted individually. The uncompressed granules 18 in the region of the drying zone 2 pass through the passage opening 25 to the inlet 12 leading to the extrusion chamber 1. The material to be extruded is further heated by the compression imparted by the extruder screw 3, the volatile constituents thereby being released depending on the degree of dryness. These volatile constituents can leave through an outlet opening 14, where they are either trapped or released into the atmosphere, depending on their nature and composition. A radially aligned discharge outlet 19 is provided at the end of the extrusion chamber 1, through which the completely extruded plastic granule leave.

In the above described embodiment, the drying medium 10 is fed axially through the internal channel 9 of the conveying screw 4. The drive unit 6 for the common shaft 7 of the extruder screw 3 and conveying screw 4 is accordingly arranged on the extrusion chamber side.

Figure 2:
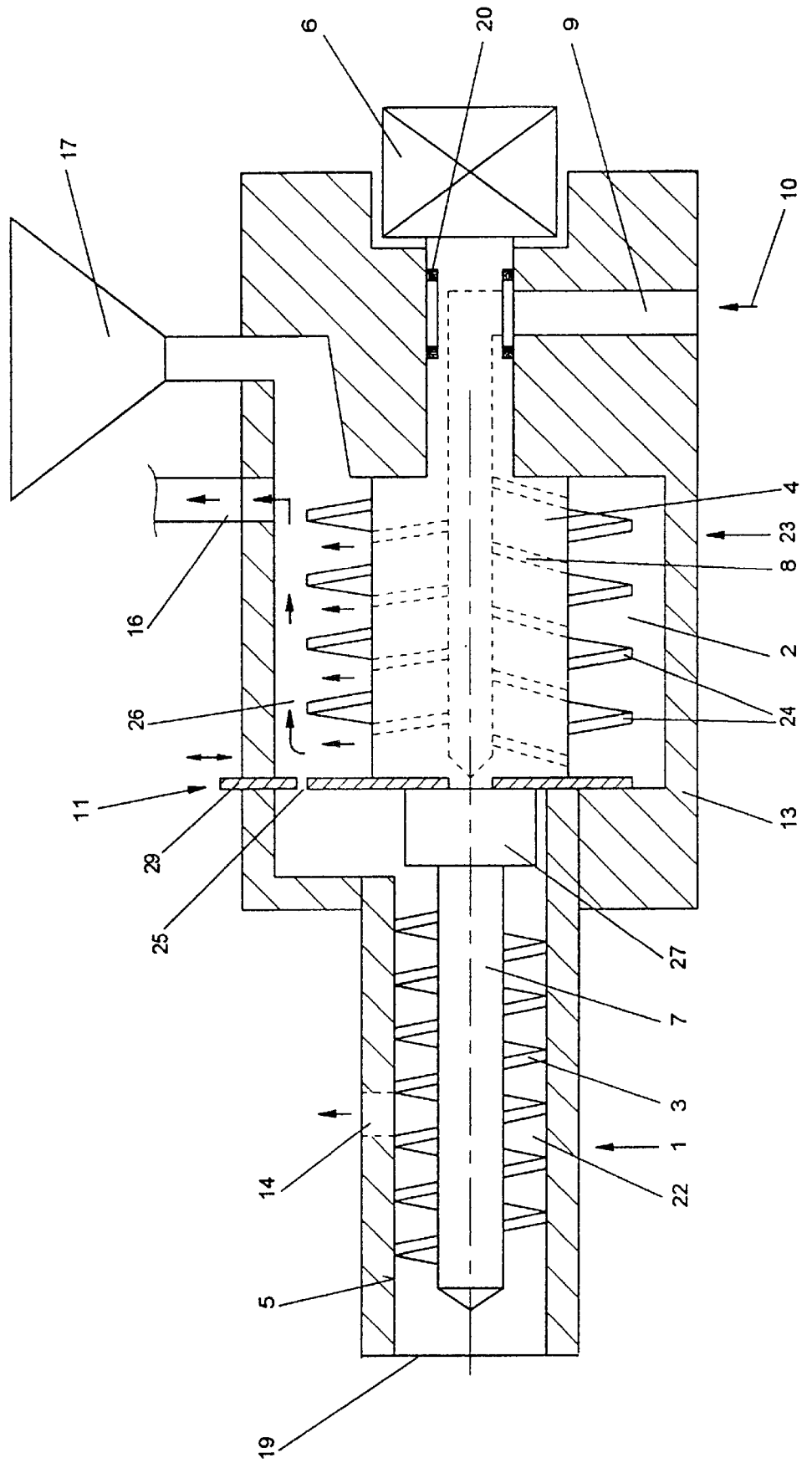
FIG. 2 is a similar view which shows an embodiment according to the invention in which the conveying screw and extruder screw are driven from the drying chamber side.

FIG. 2 shows a further embodiment of the extruder according to the invention, which substantially corresponds to the embodiment according to FIG. 1. In contrast to the extruder according to FIG. 1, the drying medium 10 is fed into the channel 9 arranged in the conveying screw 4 through a radial channel passing through the housing 13 of the drying chamber 23. With such a method of feeding the drying medium, it is possible to arrange the drive unit 6 for the conveying screw 4 and the extruder screw 3 on the drying chamber side. The heating device of the conveying screw 4 is not shown in FIG. 2. In this embodiment the conveying screw 4 and the extruder screw 3 are formed by two shafts coupled to one another by means of a gear transmission 27. The conveying screw 4 and the extruder screw 3 may be driven at different rotational speeds determined by the transmission ratio of the transmission 27 and the drive unit 6. The conveying screw 3 is mounted unilaterally by means of a bearing 20 in the housing 13 of the drying chamber 23. The extruder screw 3 is supported by its engagement with the internal wall of the housing 5 in the extrusion chamber 1.

The outlet channel 16 for the drying medium 10 from the drying chamber 23 is arranged in the vicinity of the granule feed hopper 17. This arrangement generates substantially total countercurrent conditions for the granules 18 to be heated or dried, since the drying medium 10 flows against the conveying direction of the conveying screw 4. The advantage of this countercurrent arrangement is an improved heat transfer from the drying medium 10 to the granules 18.

Due to the arrangement of the drive motor 6 on the drying chamber side, it is possible to provide an axially arranged discharge outlet opening 19 from the extrusion chamber 1. This structural feature can thus also contribute to reducing the energy expenditure required for the extrusion process since the extraction of the completely extruded plastic granules takes place without any additional deflection at the end of the extrusion chamber 1.

Figure 3:
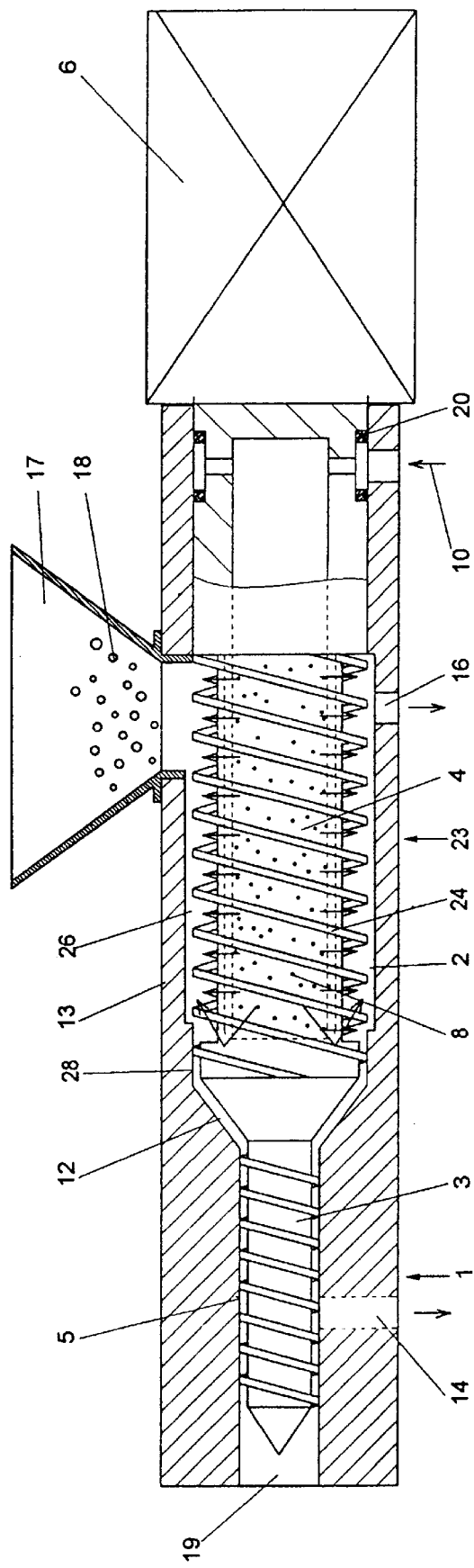
FIG. 3 is a similar view which shows an embodiment of the invention according to FIG. 2, but with a continuous transition between the drying chamber and the extrusion chamber.

FIG. 3 shows a further embodiment of the invention that substantially corresponds to the embodiment according to FIG. 2, but in which a substantially continuous transition is provided in the region between the drying chamber 23 and the extruder chamber 1, in other words, between the conveying screw 4 of the drying chamber 23 of larger diameter and the extruder screw 3 of the extrusion chamber 1 of smaller diameter. This continuous transition is in the form of a conical, i.e. funnel-shaped surface at the inlet 12.

The plastic granules 18 pass from a filling hopper 17 directly into the drying zone 2. The hollow conveying screw 4 is supplied with hot drying air 10, which is guided outwardly through radial channels 8 which open between the helical flights to the plastic granules to be dried. On account of the uniform pitch of the screw and the annular space between the external circumference of the screw and the internal circumference of the housing 13, the granules 18 are conveyed in the drying chamber 2, without however being compacted. The granules 18 are suitably dried during this conveying procedure. Since the outlet channel 16 for the drying medium from the drying zone 2 is arranged in the region of the inlet for the granules 18, the heating of the granules 18 by the hot air is accomplished virtually by the countercurrent in the drying zone 2.

The dried granules 18 are fed through the inlet 12 to the housing 5 containing the extruder screw 3. The granules are metered through a shoulder region 28 formed at the end of the drying zone 2, and which surrounds the displacement element of the conveying screw 4 without any air gap. An amount of granules predetermined by the size and pitch of the conveying screw 4 thus continuously reaches the extruder screw 3. The compaction and the extrusion then take place in the extruder chamber 1. In the lower, i.e. downstream third of the extruder chamber 1, an outlet channel 14 can be provided for the volatile constituents released by the extrusion process, if this is required by the degree of dryness of the granules. The outlet 19 for the finally extruded plastic granules is axially aligned since the common shaft 7 for the extruder screw 3 and the conveying screw 4 is driven on the drying chamber side by the common drive unit 6. In this arrangement the extruder housing 5 and the drying chamber housing 13 are formed of a common member.

A common feature of the aforedescribed embodiments is that the drying chamber 23 and the conveying screw 4 are designed so as to have a relatively large diameter, whereas the diameter of the extrusion chamber 1, i.e. the housing 5 together with the extruder screw 3, is smaller. In addition, an annular air gap 26 is formed between the conveying screw 4 and the housing 13, with the result that high residence times can be achieved, which may range from about 20 minutes up to about 1 hour. The conveying screw 4 moreover has displacement elements 24 with widely spaced sections or with a correspondingly large depth, mounted on the circumference, in order thereby to provide a large heat emitting surface area for drying the granules.

In the aforedescribed embodiments, the axial extent of the drying zone 2 and the extruder screw 3 are in each case almost identical. It is however also possible to make the drying chamber longer, and the extruder chamber correspondingly shorter. This is governed in each case by the degree of drying to be achieved and the polymer that is used, and moreover by the degree of compression to be achieved. It is furthermore also possible to design both chambers to have roughly the same diameters, but with the screws having different pitches. In such an embodiment the pitch of the screw in the drying chamber 23 is substantially constant, whereas it is variable in the extruder chamber. The extruder screw may also have a decreasing flight depth in the conveying direction.

In the drawings and specification, there has been set forth a preferred embodiment of the invention, and although specific terms are employed, they are used in a generic and descriptive sense only and not for purposes of limitation.

That which is claimed is:

1. An extruder for melting and extruding plastic granules comprising
    an extruder chamber comprising a tubular extruder housing and an extruder screw rotatably mounted in the extruder housing, said extruder housing having an inlet end and a discharge end,
    a drying chamber mounted to said inlet end of said extruder housing for drying plastic granules and conveying the same without substantial compression to said inlet end of said extruder housing, said drying chamber comprising a tubular drying housing and a conveying screw rotatably mounted in said drying housing, with said conveying screw having an external diameter which is greater than the external diameter of the extruder screw,
    means for rotatably driving the extruder screw and the conveying screw, and
    wherein the drying housing has an internal bore which has a diameter greater than the external diameter of the conveying screw so as to form an air gap between the conveying screw and the internal bore, and wherein the drying chamber further comprises an opening for delivering plastic granules into the internal bore of the drying housing and means for conveying a drying medium through the internal bore of said drying housing for drying the plastic granules therein.

2. The extruder as defined in claim 1 wherein said extruder screw and said conveying screw each include displacement elements for axially conveying the plastic granules upon rotation of the associated screw, and wherein the displacement elements of the conveying screw have a depth which is greater than the displacement elements of the extruder screw.

3. The extruder as defined in claim 1 wherein said means for conveying a drying medium through the internal bore of said drying housing comprises an internal channel extending axially within said conveying screw and a plurality of radial channels extending from said internal channel to the outer periphery of said conveying screw.

4. The extruder as defined in claim 3 wherein said means for conveying a drying medium through the internal bore of said drying housing further comprises means for supplying heated air to said internal channel in said conveying screw.

5. The extruder as defined in claim 4 wherein said extruder defines a conveying direction extending from said opening in said drying chamber toward said discharge end of said extruder housing, and wherein said radial channels of said means for feeding a drying medium into the internal bore of said drying housing are positioned so that at least a substantial portion of the heated air flows through said internal bore of said drying chamber in a direction counter to said conveying direction.

6. The extruder as defined in claim 1 wherein said extruder chamber includes means for heating the extruder housing, and further comprising heat exchange means for transferring heat energy from said extruder housing to said means for supplying heated air to said internal channel in said conveying screw.

7. The extruder as defined in claim 1 wherein said conveying screw and said extruder screw are coaxially interconnected.

8. The extruder as defined in claim 7 wherein said conveying screw and said extruder screw are coaxially interconnected by means of a gear transmission.

9. The extruder as defined in claim 7 wherein said conveying screw and said extruder screw are coaxially interconnected by means of a conical transition member.

10. The extruder as defined in claim 7 wherein said extruder housing and said drying housing are integrally interconnected.

11. The extruder as defined in claim 1 further comprising a metering device positioned between said conveying screw and said extruder screw for regulating the residence time of the plastic granules in the drying chamber.

12. The extruder as defined in claim 1 further comprising means for heating the drying chamber.

13. The extruder as defined in claim 1 further comprising at least one outlet channel in said extruder housing for discharging gasses that may be released from the plastic granules during the melting and extrusion thereof.

14. An extruder for melting and extruding plastic granules comprising
    an extruder chamber comprising a tubular extruder housing and an extruder screw rotatably mounted in the extruder housing, said extruder housing having an inlet end and a discharge end,
    a drying chamber mounted to said inlet end of said extruder housing and comprising a tubular drying housing and a conveying screw rotatably mounted in said drying housing, with said drying housing including a cylindrical internal bore and an opening for delivering plastic granules into the internal bore, and with the diameter of the internal bore being substantially greater than the external diameter of said conveying screw so as to form an air gap between the conveying screw and the internal bore, and such that plastic granules received in the opening of said drying housing are axially conveyed without substantial compression to said inlet end of said extruder housing upon rotation of said conveying screw, means for rotatably driving the extruder screw and the conveyor screw, and means for circulating a drying medium through the internal bore of said drying housing for drying the plastic granules therein.

15. The extruder as defined in claim 14 wherein said means for circulating a drying medium through the internal bore of said drying housing comprises an internal channel extending axially within said conveying screw and a plurality of radial channels extending from said internal channel to the outer periphery of said conveying screw.

16. The extruder as defined in claim 15 wherein said conveying screw and said extruder screw are coaxially interconnected, and wherein said extruder housing and said drying housing are integrally interconnected.

17. The extruder as defined in claim 14 further comprising a metering device positioned between said conveying screw and said extruder screw for regulating the residence time of the plastic granules in the drying chamber.

18. The extruder as defined in claim 14 further comprising means for heating the extruder housing.

19. The extruder as defined in claim 18 wherein said extruder screw includes a conveying section adjacent said inlet end and a plasticising section adjacent said discharge end.

20. The extruder as defined in claim 14 wherein said conveying screw has an external diameter which is greater than the external diameter of the extruder screw.

21. The extruder as defined in claim 20 wherein said extruder screw and said conveying screw each include displacement elements for axially conveying the plastic granules upon rotation of the associated screw, and wherein the displacement elements of the conveying screw have a depth which is greater than the depth of the displacement elements of the extruder screw.

22. An extruder for melting and extruding plastic granules comprising an extruder chamber comprising a tubular extruder housing and an extruder screw rotatably mounted in the extruder housing, said extruder housing having an inlet end and a discharge end, a drying chamber mounted to said inlet end of said extruder housing for drying plastic granules and conveying the same without substantial compression to said inlet end of said extruder housing, said drying chamber comprising a tubular drying housing and a conveying screw rotatably mounted in said drying housing, with said conveying screw having an external diameter which is greater than the external diameter of the extruder screw, and wherein said conveying screw and said extruder screw are coaxially interconnected by means of a conical transition member, means for rotatably driving the extruder screw and the conveying screw, and means for heating the plastic granules as they are conveyed through the drying chamber to dry the same.

* * * * *